No. 759,187. PATENTED MAY 3, 1904.
G. H. OBER.
SANDER OR SMOOTHING MACHINE.
APPLICATION FILED DEC. 13, 1901.
NO MODEL. 6 SHEETS—SHEET 1.
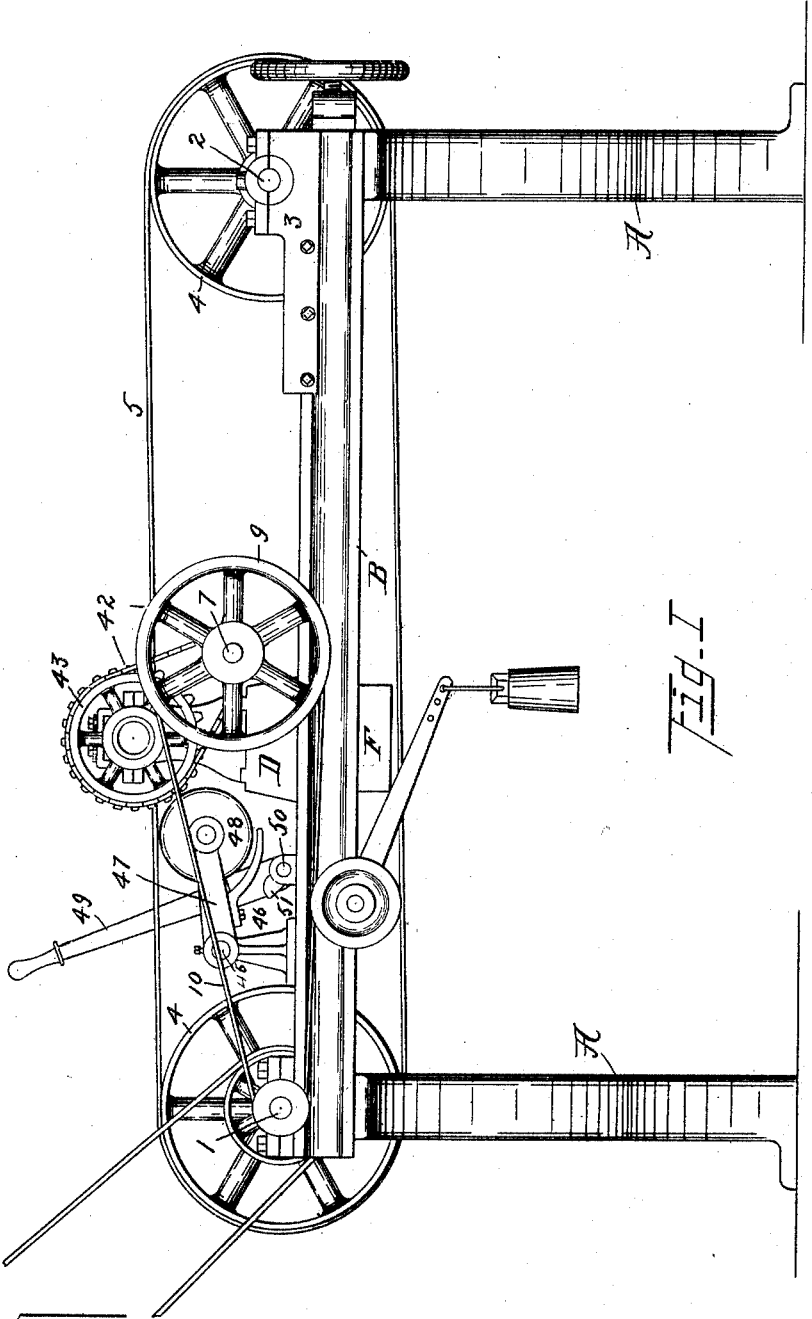
Fig. I
Witnesses:
F. Griswold,
N. G. Smith
Inventor.
Geo. H. Ober
By H. S. Sprague
Atty No. 759,187. PATENTED MAY 3, 1904.
G. H. OBER.
SANDER OR SMOOTHING MACHINE.
APPLICATION FILED DEC. 13, 1901.
NO MODEL. 6 SHEETS—SHEET 2.
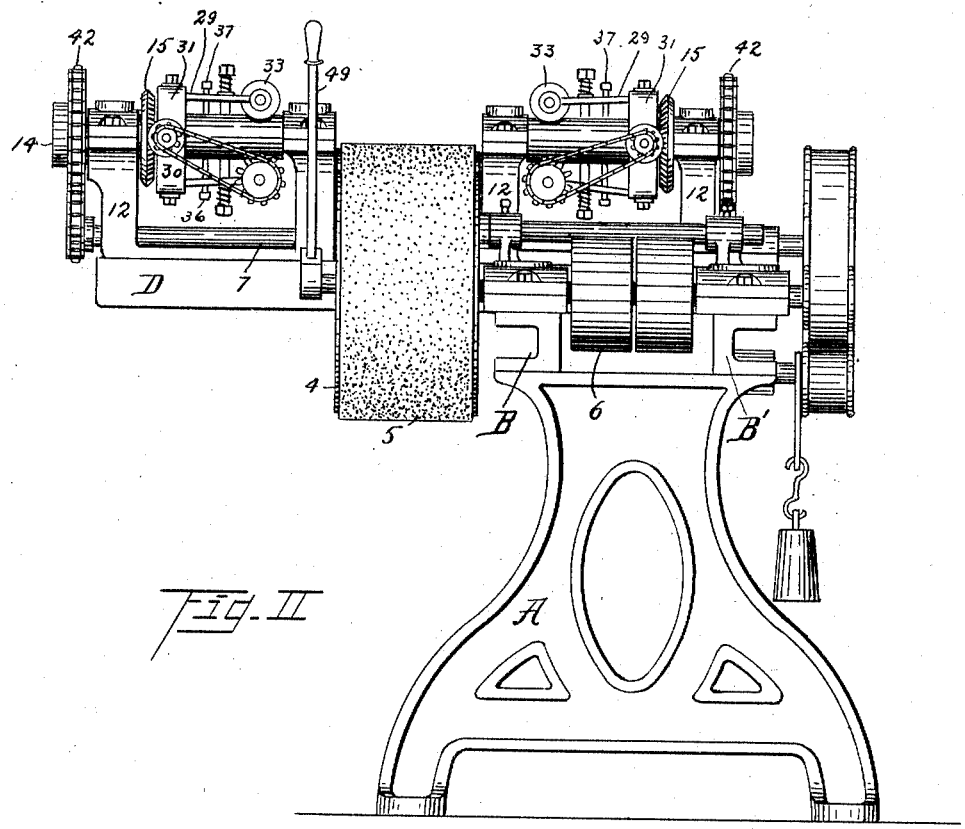

No. 759,187. PATENTED MAY 3, 1904.
G. H. OBER.
SANDER OR SMOOTHING MACHINE.
APPLICATION FILED DEC. 13, 1901.
NO MODEL. 6 SHEETS—SHEET 3.
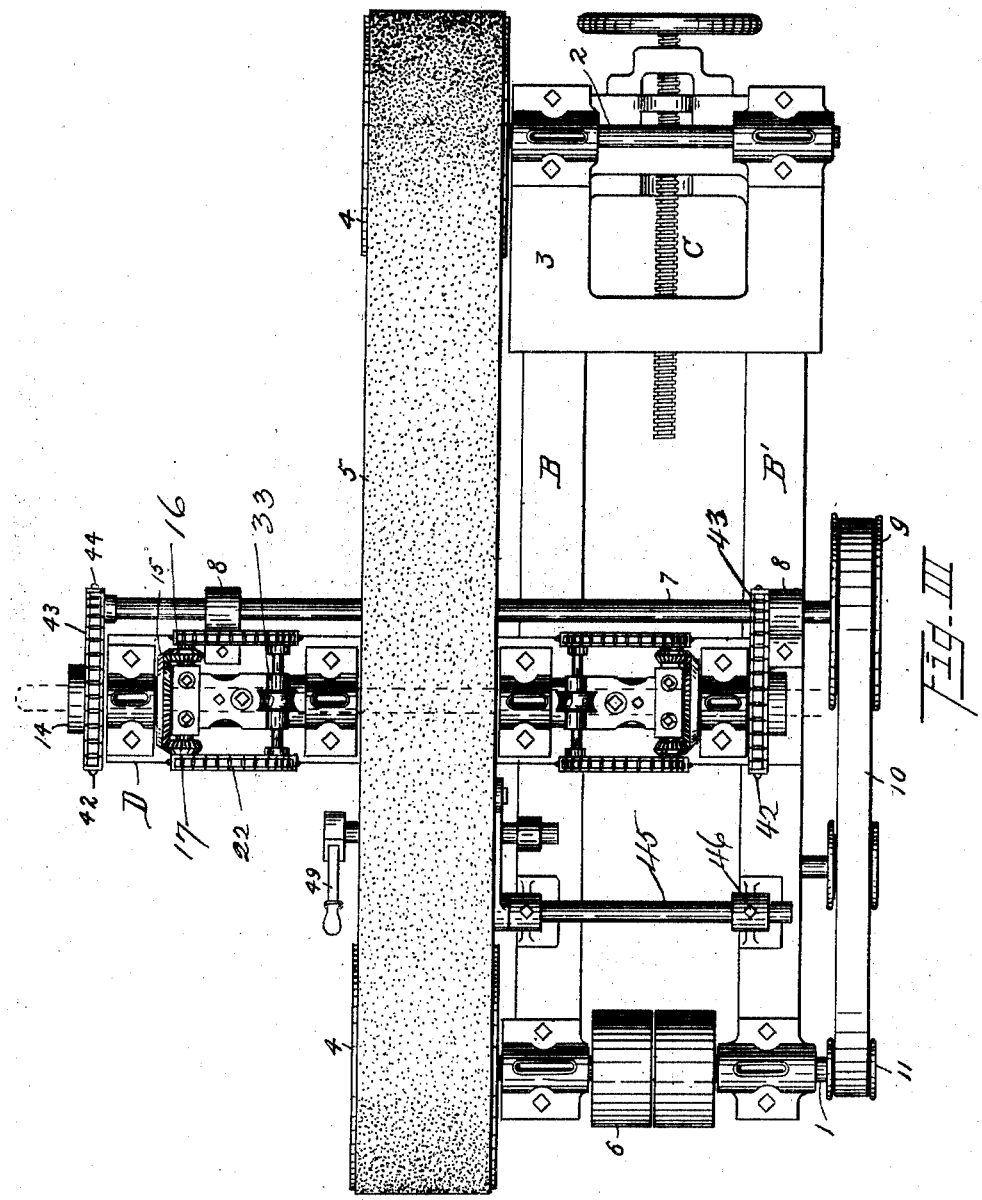

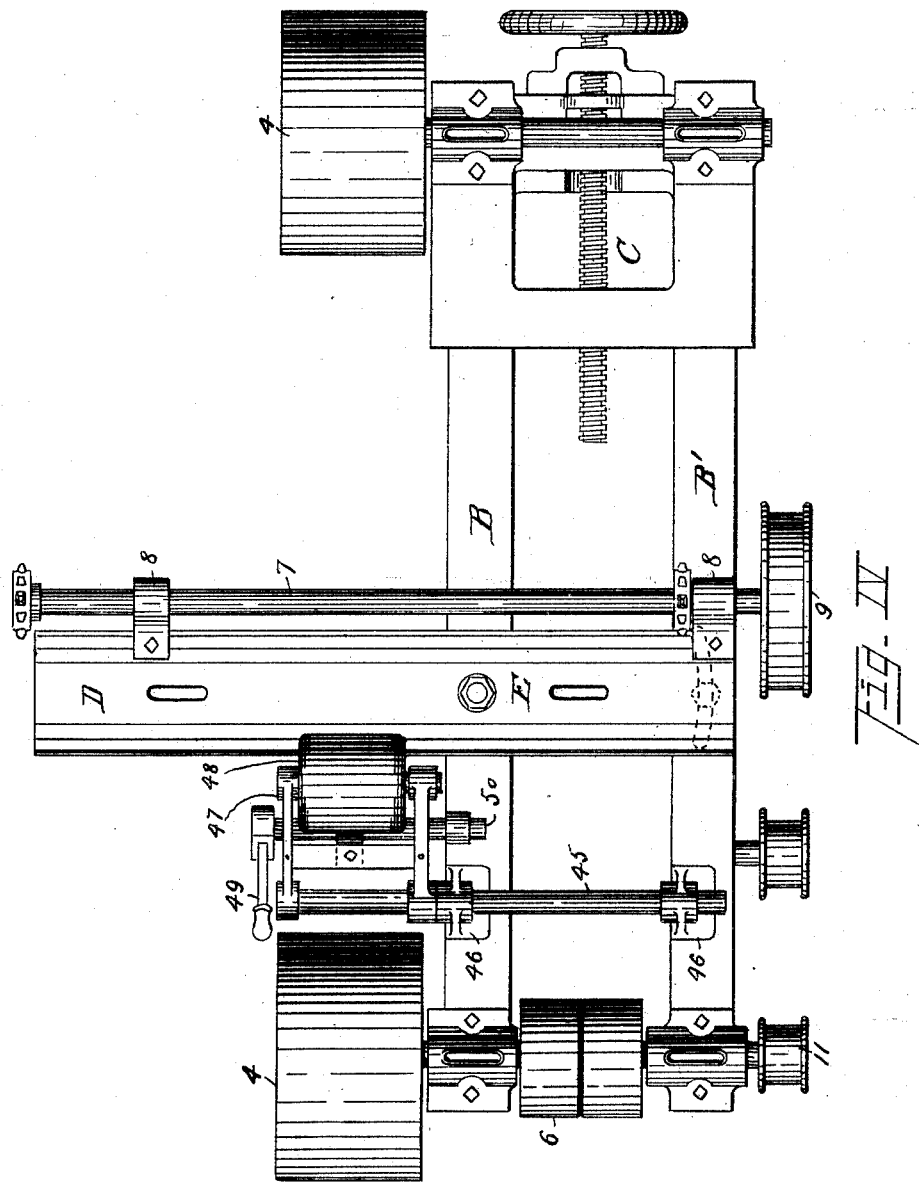

No. 759,187. PATENTED MAY 3, 1904.
G. H. OBER.
SANDER OR SMOOTHING MACHINE.
APPLICATION FILED DEC. 13, 1901.
NO MODEL. 6 SHEETS—SHEET 5.
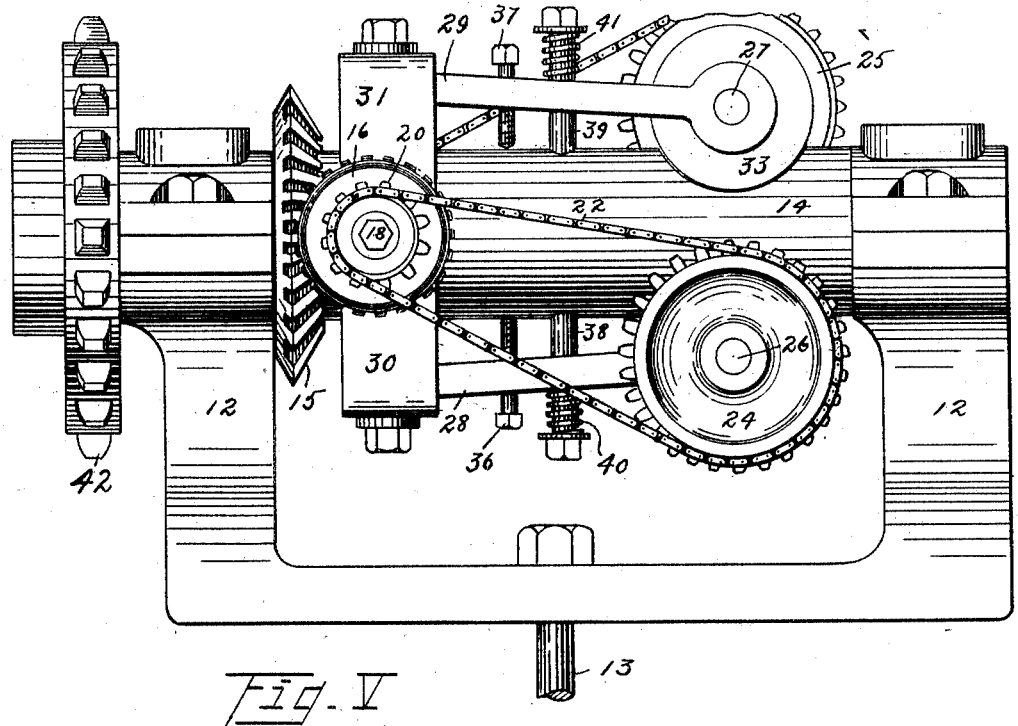
Fig. V
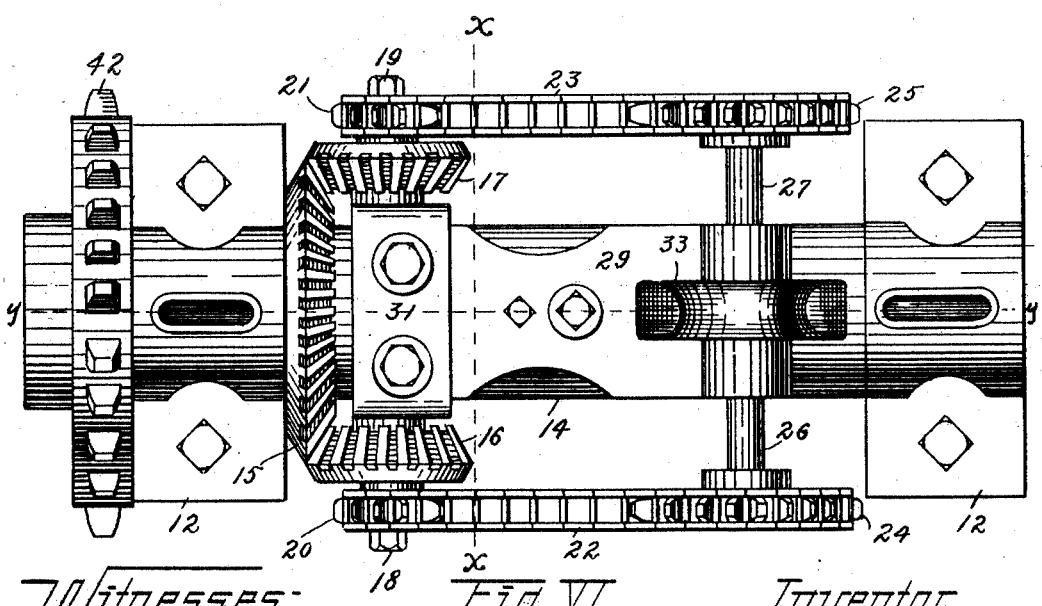
Fig. VI
Witnesses: Inventor.

No. 759,187. PATENTED MAY 3, 1904.
G. H. OBER.
SANDER OR SMOOTHING MACHINE.
APPLICATION FILED DEC. 13, 1901.
NO MODEL. 6 SHEETS—SHEET 6.
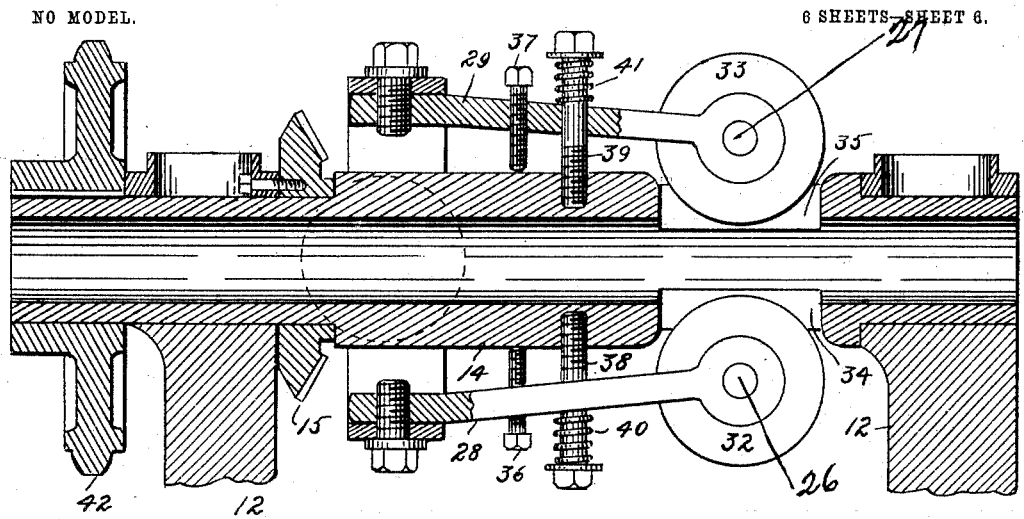
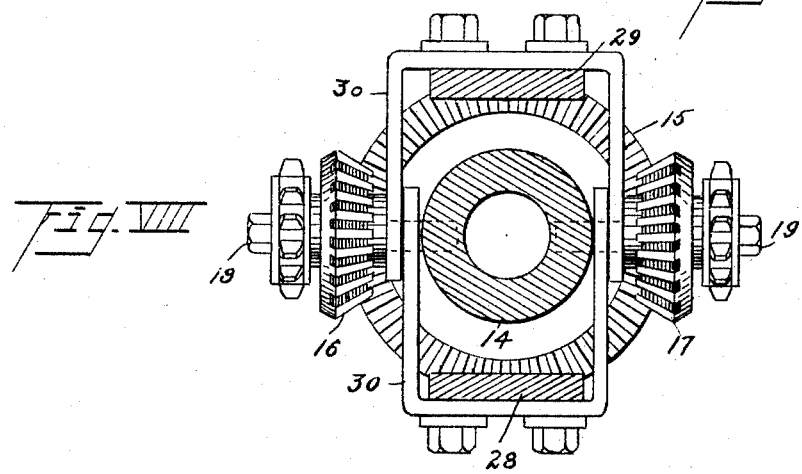
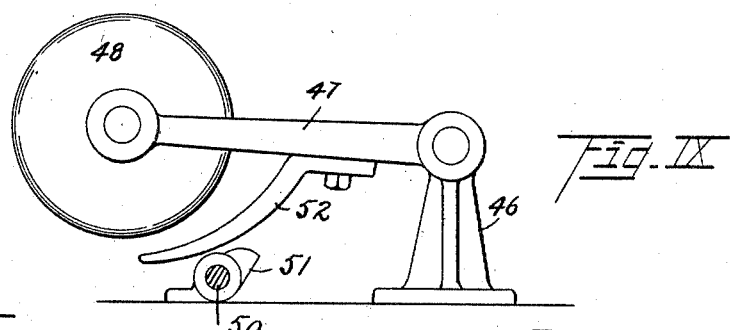
Witnesses:
Inventor:
Geo. H. Ober No. 759,187. Patented May 3, 1904.

UNITED STATES PATENT OFFICE.

GEORGE H. OBER, OF CHAGRIN FALLS, OHIO.

SANDER OR SMOOTHING-MACHINE.

SPECIFICATION forming part of Letters Patent No. 759,187, dated May 3, 1904.

Application filed December 13, 1901. Serial No. 85,847. (No model.)

*To all whom it may concern:*

Be it known that I, GEORGE H. OBER, a citizen of the United States, and a resident of Chagrin Falls, in the county of Cuyahoga and State of Ohio, have invented a new and useful Improvement in Sanders or Smoothing-Machines, of which the following is a specification.

The nature of this invention relates to certain new and useful improvements in devices for "sanding" or smoothing turned wooden articles by bringing them in contact with a rapidly-moving sand-belt.

The invention has for its object the construction of a machine for the purpose named which shall be automatic in its action and adjustable to the reception of different widths of sand-belts.

To this end the invention consists in the peculiar construction of rotating heads through which the article to be operated upon is fed and rotated, in the adjustable mechanism for feeding the article through said heads, in the means for bringing the face of the sand-belt in contact with the article, and in the peculiar construction, arrangement, and combinations of the various parts, all as more fully hereinafter set forth, and pointed out in the claims.

In the accompanying drawings, which form a part of this specification, Figure 1, Sheet 1, is a side elevation of my improved machine. Fig. 2, Sheet 2, is a front end elevation. Fig. 3, Sheet 3, is a top plan. Fig. 4, Sheet 4, is a top plan with the rotating heads removed. Fig. 5, Sheet 5, is an enlarged side elevation of one of the rotating heads detached from the machine. Fig. 6, Sheet 5, is a top plan of Fig. 5. Fig. 7, Sheet 6, is a vertical longitudinal section on the line $y$ $y$ of Fig. 6. Fig. 8, Sheet 6, is a vertical cross-section on the line $x$ $x$, Fig. 6. Fig. 9 is an enlarged elevation of the adjustable roll over which the sand-belt travels.

A represents legs upon which are rigidly secured the bed-pieces B B', which support the operating mechanism, as hereinafter set forth. These bed-pieces are preferably of the form shown. A shaft 1 is journaled in proper transverse bearings across one end of the bed-pieces, and a shaft 2 is journaled in similar bearings in a sliding frame 3. At the opposite end of the machine, 4 represents pulleys rigidly secured upon corresponding ends of the shafts 1 and 2, and these pulleys are designed to carry a sanded belt 5, motion thereto being communicated by means of a belt upon the pulley 6.

The frame 3 has a longitudinal sliding movement upon the bed-pieces B B' for keeping the sanded belt at the proper tension, the frame being retained to position through the medium of the screw C.

D is a transverse bed-plate which is adjustably secured upon the bed-pieces B B' by means of a bolt E, which passes down through said plate, the underlying bed-piece B, and the retainer-block F in such manner as will admit of said table being adjustable to a slight angle with the line of travel of the sand-belt, said bed-plate D being secured to adjusted position by means of a bolt and segmental slot. (Shown in dotted lines in Fig. 4.) The transverse bed-plate may also be removed entirely from the machine in case it is desired to use the latter as an ordinary sander. Hereinafter it will be seen that the machine is normally operated as an automatic sander; but when some articles are being sanded it is impossible to use the automatic feature, in which case it is only necessary to remove the transverse bed-plate, when the machine can be used for sanding said articles in a way that is common to the ordinary sanding-machine.

7 is a shaft which is journaled in proper bearings 8 on the bed-plate D, one end of said shaft carrying a pulley 9, over which runs a belt 10 from the small pulley 11 upon the corresponding end of the shaft 1.

As the two revolving heads through which the article to be smoothed passes are identical, one being located at each edge of the sanding-belt, I will describe but one head, using the same letters and figures of reference upon each.

12 represents a suitable bracket which is secured to the transverse bed D by means of a suitable bolt 13, which passes down through a slot in the bed D, said slot being shown in Fig. 4. This is to admit of an adjustment of the heads in the longitudinal direction of the bed-piece D. Journaled in proper bearings in the upper ends of the bracket 12 is a hollow head 14, which passes through a bevel-gear 15, rigidly secured to the bracket 12 and which meshes with similar but smaller gears 16 17, journaled upon the stub-shafts 18 19, projecting from the hollow head 14. The stub-shafts 18 19 carry the sprocket-wheels 20 21, from which the sprocket-chains 22 23 impart motion to the sprocket-wheels 24 25 upon the shafts 26 27, journaled in the free ends of the arms 28 29, the opposite ends of which latter are rigidly secured to the frames 30 31, through which the stub-shafts 18 19 pass. The free ends of the arms 28 29 carry grooved wheels or feed-rolls 32 33 upon the stub-shafts 26 27, the peripheries of such rolls projecting through the slots 34 35, communicating with the bore of the head 14. The rolls 32 33 not only feed the article being operated upon through the head 14, but also compel such article to rotate with the head. 36 37 are bolts tapped through the arms 28 29, the inner ends coming in contact with the face of the head 14 and are for the purpose of adjusting the grooved rolls 32 33. 38 39 are bolts projecting from the head 14, passing loosely through the arms 28 29, receiving upon their outer ends springs 40 41, which are retained in place by means of suitable washers and nuts, as shown. A sprocket-wheel 42 upon the projecting end of the rotatable head 14 receives motion by means of a sprocket-chain 43 upon sprocket-wheel 44 upon the corresponding end of the shaft 7, which latter receives motion by means of a belt 10, driven from the main shaft 1.

From the above description it will be seen that when the sprocket-wheel 42 is turned the arms 29 and also their feed-rollers will be revolved about the axis of the head 14 and that there will be a centrifugal force tending to throw the rollers outwardly. This force will be resisted by the springs 40 41. At times, however, this movement will set the article operated on to vibrating, and, as will be understood, the greater the amplitude of vibration the greater will be the tendency to vibrate, the result being that it is very difficult to turn out satisfactory work. To prevent such vibrations, the set-screws 36 37 are employed, said set-screws preventing the rollers from following up the work as it is thrown from the central axis of the hollow head 14.

45 is a rock-shaft properly journaled in the heads of the brackets 46, rising from the bed-pieces B B', and upon this rock-shaft is secured a frame 47, which carries a roller 48 in close proximity to the inner face of the sand-belt 5, as shown in Fig. 1.

49 is a lever upon the rod 50, which rod is provided with a cam 51, which may be turned by means of the lever 49, so as to come in contact with an arm 52, projecting from the frame 47, as a means for raising the roller 48 into contact with the sand-belt and for bringing the latter into contact with the article to be operated upon. By reference to Fig. 1 it will be seen that this roller does not contact with the belt directly opposite said article, but at one side of the same, so that the belt is bent around the latter. This arrangement of the roller results in giving an extended wearing or cutting surface and greatly increases the efficiency of the machine.

By the construction and arrangements of parts substantially as herein described it will readily be seen that the various parts receive motion from the one shaft and travel in the same direction. The hollow heads revolve at stationary points in the mechanism, but in the same direction as the travel of the sand-belt. Motion having been communicated to the machine, the article to be operated upon is fed into the hollow shaft 14, which is upon the projecting end of the bed-plate D, until it is grasped by the feed-rolls 32 33, which latter feed the article through said head across the face of the rapidly-moving sand-belt and into the hollow head 14 upon the opposite edge of the belt, it being necessary to have the two heads in order that the article may be operated upon throughout its entire length.

In the drawings the revolving heads 14 are shown as adjustable to their outward limit—that is, so as to permit of the employment of a wide belt for operating upon long stock. When short stock is to be operated upon and a narrow sand-belt employed, the heads may be readily adjusted toward each other upon the bed-plate D, as hereinbefore described, and such bed-plate may, if desired, be turned slightly to an angle with the line of travel of the sand-belt for the purpose of making a shearing grind across the face of the article being operated upon.

What I claim as my invention is—

1. In a machine of the character described the combination of a traveling sand-belt, rotatable heads journaled in bearings that are separately and independently adjustable upon a transverse bed-plate, said bed-plate having an adjustment annular to the line of travel of the sand-belt, substantially as and for the purpose specified.

2. In a machine of the character described, the combination of an abrading device, mechanism for simultaneously rotating and longitudinally feeding an article past the abrading device, and means whereby the said mechanism may be adjusted so as to incline the article to the direction of motion of the abrading device for the purpose specified.

3. In a machine of the character described, the combination of bed-pieces, a shaft journaled in fixed bearings at one end of said bed-pieces, a second shaft journaled in adjustable bearings at the opposite end thereof, pulleys carried by said shafts and a sand-belt carried by said pulleys, mechanism for simultaneously rotating and longitudinally feeding an article past the abrading device, and means whereby the said mechanism may be adjusted so as to incline the article to the direction of motion of the abrading device for the purpose specified.

4. In a machine of the character described, the combination of an abrading device, rotatable hollow heads journaled on opposite sides of the abrading device, arms carried by said heads and on the opposite sides thereof, feed-rollers journaled in said arms, bolts projecting through the said arms and abutting the head to hold the arms outwardly, and a spring acting on the outer sides of the arms to press the same inwardly, for the purpose specified.

5. In a machine of the character described, the combination of an abrading-belt, means for holding an article in position to be operated upon by said belt, a roller for pressing the belt against the article, a frame in which said roller is journaled, a rock-shaft having a cam for lifting the frame and roller, and a hand-lever for rocking the shaft.

6. In a machine of the character described, the combination of an abrading-belt, means for holding an article in position to be operated upon by said belt, a roller for pressing the belt against the article, a frame in which said roller is journaled, an arm on said frame, a rock-shaft having a cam for engaging the arm to lift the frame and roller, and a hand-lever for rocking the shaft.

7. In a machine of the character described, the combination of bed-pieces a traveling sand-belt mounted in said bed-pieces, a bed-plate mounted on said bed-pieces and extending transversely thereto, means carried by said transverse bed-plate for holding an article to be sanded to the belt, and removable connections between the bed-pieces and bed-plate, so that the latter may be removed for the purpose specified.

8. In a device of the character described, the combination of the abrading device, of pivoted arms, opposing feed-rollers mounted in the free ends of said arms, mechanism for imparting rotary and planetary movement to the rollers, and means for regulating the extent of movement of said rollers toward each other, for the purpose specified.

GEO. H. OBER.

Witnesses:
 HENRIETTA SPRAGUE,
 CHAS. M. WICKS.